United States Patent [19]

Crankshaw

[11] 4,047,602
[45] Sept. 13, 1977

[54] SYNCHRONIZING COUPLING

[75] Inventor: John H. Crankshaw, Erie, Pa.

[73] Assignee: Dynetics, Inc., Pa.

[21] Appl. No.: 639,910

[22] Filed: Dec. 11, 1975

[51] Int. Cl.² .......................................... F16D 11/00
[52] U.S. Cl. .................................................. 192/53 F
[58] Field of Search .......................... 192/53 R, 53 F

[56] References Cited

U.S. PATENT DOCUMENTS

| 2,563,726 | 8/1951 | Kelbel | 192/53 F |
| 2,627,956 | 2/1953 | Peakins | 192/53 F |
| 2,930,462 | 3/1960 | Willis | 192/53 F |
| 3,071,224 | 1/1963 | Crankshaw | 192/53 F |
| 3,286,801 | 11/1966 | Wojcikonski | 192/53 F |

FOREIGN PATENT DOCUMENTS

| 1,114,063 | 4/1956 | France | 192/53 F |

Primary Examiner—Samuel Scott
Assistant Examiner—Randall Heald

[57] ABSTRACT

A gear coupling and oil actuated synchronizing clutch is disclosed. The oil is connected to the clutch by a static seal ring freely supported on the drive shaft, next to a shaft flange. The seal ring has a piston groove containing a piston ring adjacent the flange overlying a narrower groove in the flange. Engage oil in the static seal groove forces the piston ring against the flange and holes in the piston ring conduct oil to the flange groove and then to the disc pack and clutch actuating mechanism. The disc pack has a larger inlet than outlet so that the engage oil fills the pack introducing a viscous drag to the discs and initiating action of balking mechanism. Drive pins are advanced into kidney-shaped holes where they form an interium connection after synchronism and before gear engagement so that the drive gears can freely register with the driven gear.

21 Claims, 13 Drawing Figures

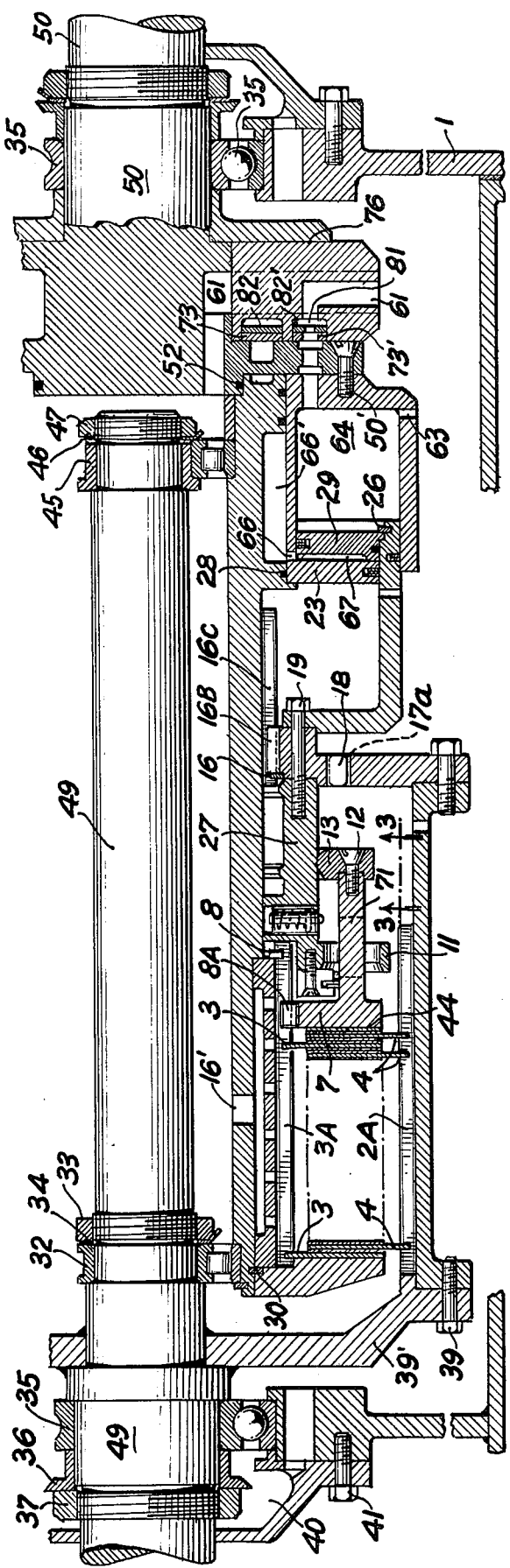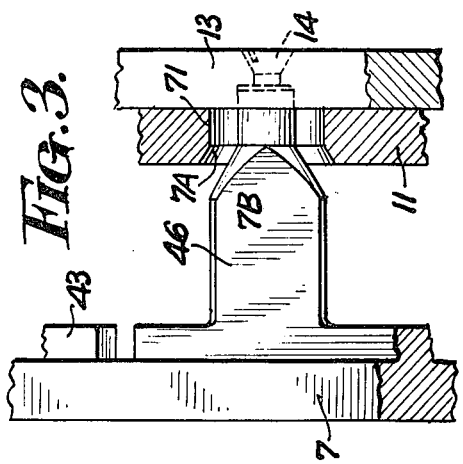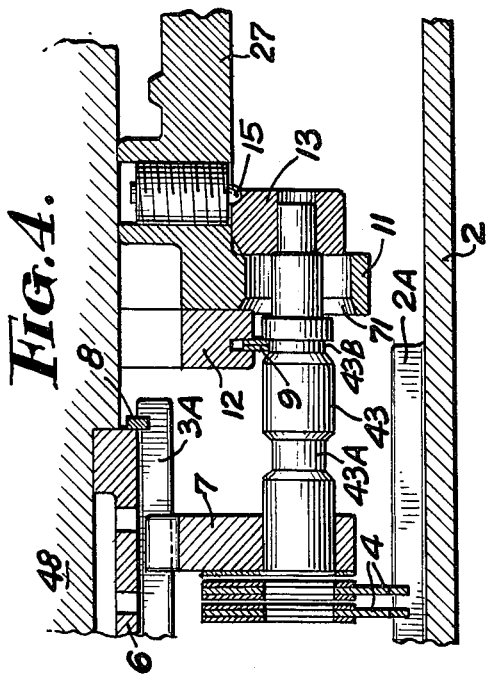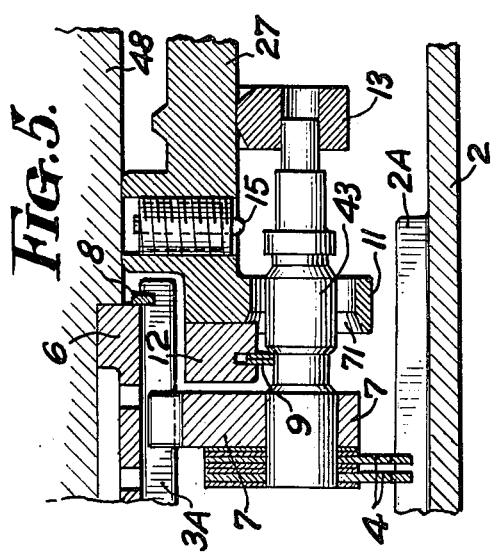

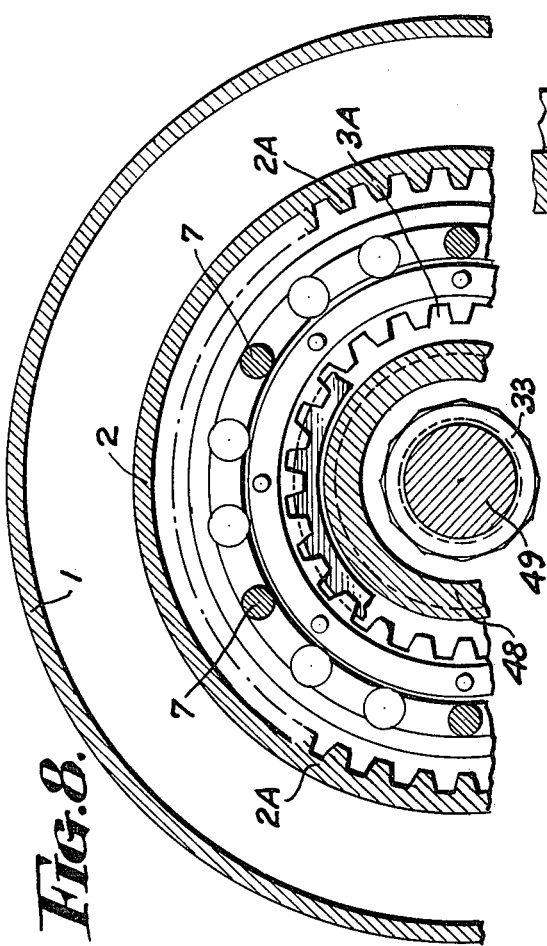
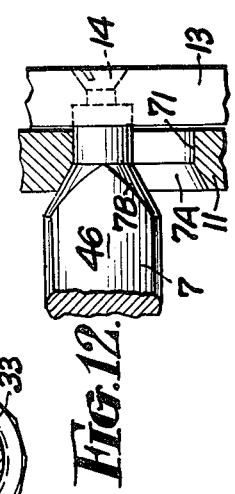
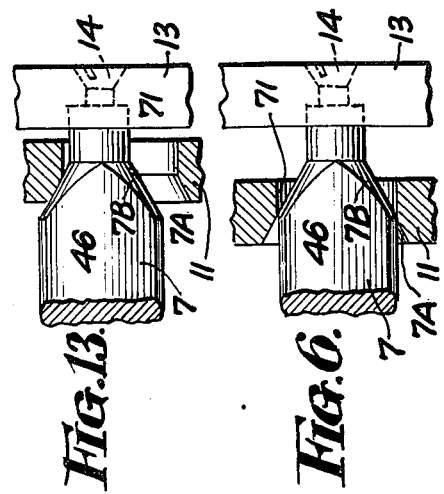
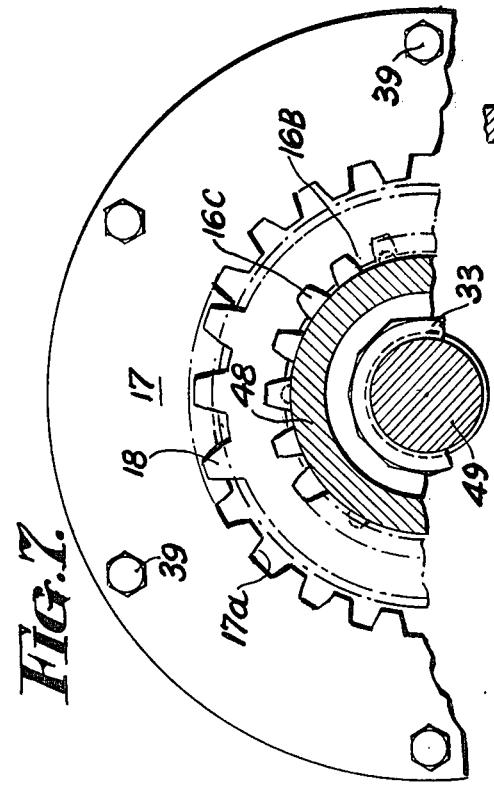
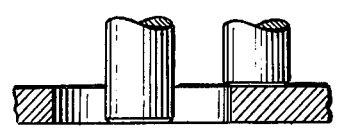
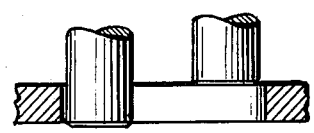
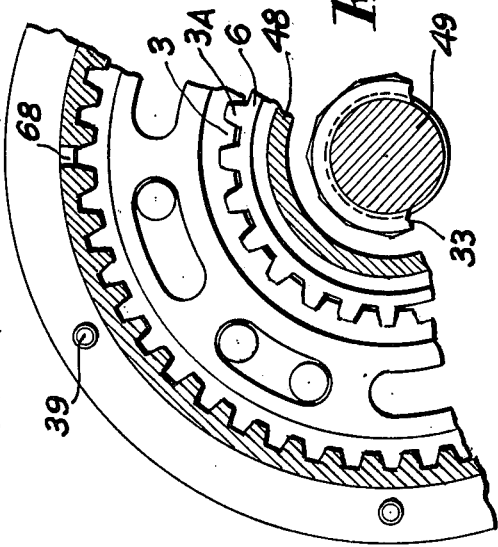

SYNCHRONIZING COUPLING

REFERENCE TO PRIOR ART

This application is an improvement over U.S. Pat. No. 3,071,224.

GENERAL DESCRIPTION OF INVENTION

The clutch case assembly provides support bearings at each end complete with seals, pipe connections for lube oil, engagement oil and disengagement oil.

The rotating elements include an input shaft 50, supporting an oil transfer seal, attached to a clutch shaft 49 on which the disc pack 3, balking mechanism, torque transfer mechanism, and actuating cylinders are mounted, and an output shaft 49 to which the load end and power end sleeves are attached. The clutch and load end shaft are mutually supported on roller bearings 32, while the input and output shafts are supported and axially located by the ball bearings 35.

When the clutch is engaged, the entire rotating assembly turns as a single unit on ball bearings 35. When disengaged, the output shaft 49, load end and power end sleeve, and half the disc pack stand still while the remaining parts rotate with the input shaft 50. Shaft connections to adjacent equipment can be made in any manner familiar to those skilled in the art. Provision can be made to permit clutch installation and removal without disturbing the connected equipment.

OBJECTS OF THE INVENTION

It is an object of the invention to provide an improved synchronizing coupling.

Another object of the invention is to provide a synchronizing clutch that is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF DRAWINGS

FIG. 2 is a partial longitudinal cross sectional view similar to FIG. 1 showing the clutch engaged.

FIG. 3 is an enlarged cross sectional view taken at line 3—3 of FIG. 2.

FIG. 4 is a partial view showing the drive pins and synchronizing pins disengaged.

FIG. 5 is a cross sectional view similar to FIG. 4 showing the clutch engaged.

FIG. 6 is an enlarged view of a synchronizing pin in position away from its blocking position, as at synchronized speed.

FIG. 7 is a lateral cross sectional view taken on line 7—7 of FIG. 1.

FIG. 8 is a cross sectional view taken at line 8—8 of FIG. 1.

FIG. 9 is a cross sectional view taken on line 9—9 of FIG. 1.

FIG. 10 is an enlarged partial view showing the random engagement of drive pins with kidney shaped holes in friction discs after synchronization.

FIG. 11 is a view showing the drive pins in driving position with sides of kidney holes acting as loose keys during transition from friction to coupling drive.

FIG. 12 is an enlarged, cross sectional view showing the synchronizing pins in a first position during engagement.

FIG. 13 is a view similar to FIG. 11, showing the synchronizing pins at an intermediate blocking position.

FIG. 14 shows the pins at the synchronized speed.

GENERAL OPERATION OF CLUTCH DESCRIPTION

Figure 1:
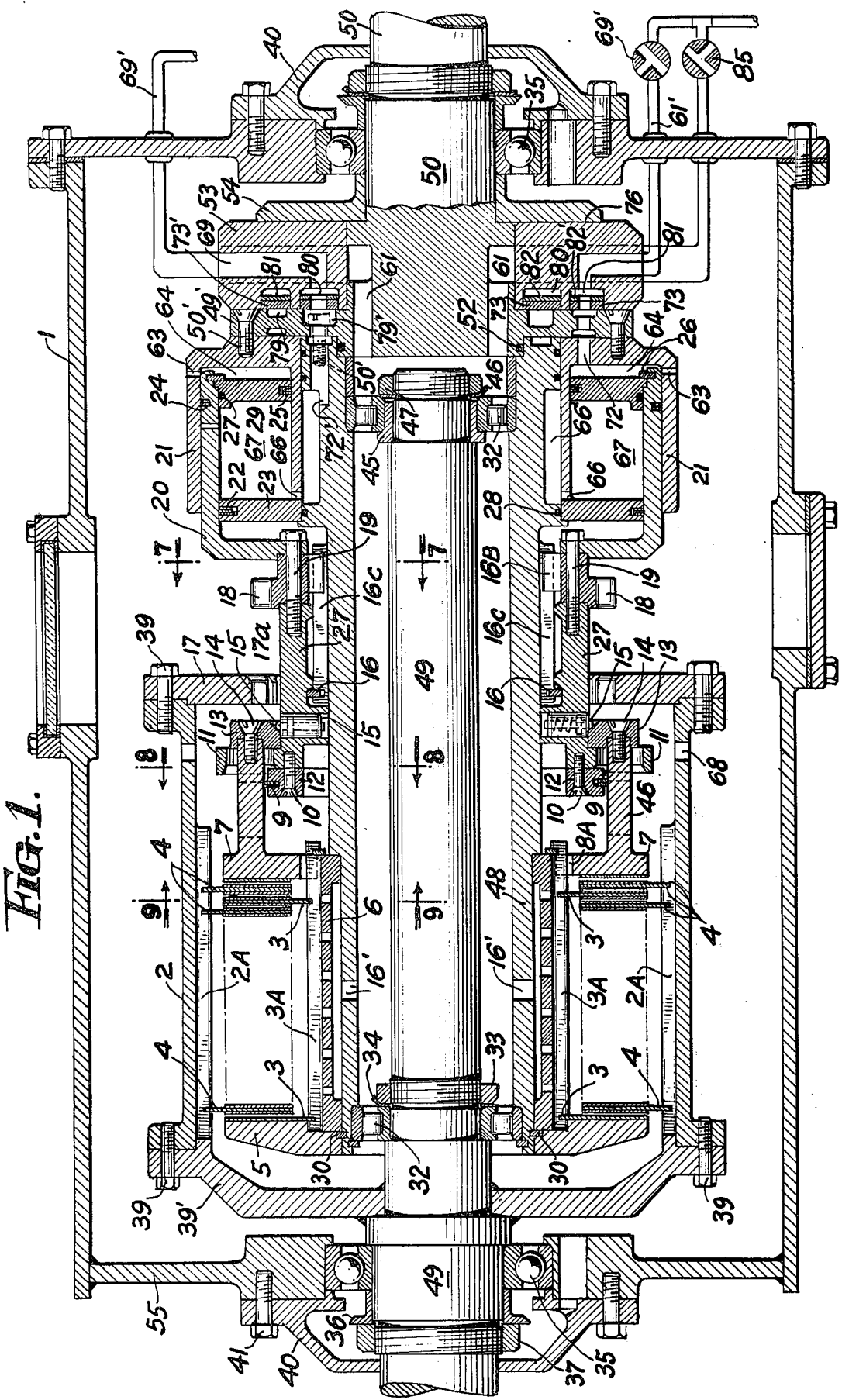
FIG. 1 is a longitudinal cross sectional view of the clutch, according to the invention, showing the drive member and driven member disengaged.

The purpose of the clutch is to accelerate the driven shaft 49 to synchronism with the drive shaft 50 so that the drive gear teeth 18 can engage the driven gear teeth 17A without interference. The synchronizing mechanism is broadly made up of the discs 3 and 4, the sleeve 7, and the sleeve 27. The piston 29 and sleeve 27 act through balking mechanism and the sleeve 7 to exert a force on the discs. This is accomplished by oil introduced into chamber 64, thereby forcing the piston sleeve 27 toward the clutch plates. At the same time, oil fills the disc cavity thereby causing the drive discs 3 to drag driven discs 4 around with them, thereby rotating the synchronizing sleeve 7 and moving the synchronizing pins 46, so that the cammed surfaces 7B on their ends engage the cammed surfaces 7A on the sides of the holes 71 and prevents the pins 46 from entering the holes 71. The piston sleeve 27 then exerts its force by pins 46 onto the synchronizing ring 7, therefore forcing the discs together and exerting a further rotational force on the synchronizing ring and detent ring 11. The frictional force developed between the discs, continues to accelerate the load on shaft 49 until it reaches the speed of the drive shaft 50. At this point, the force is reduced between the cam surfaces 7B and 7A and the synchronizing pins 46 slide into the holes 71, thereby releasing the force on the discs. At the same time, the sleeve 27 pushes the drive pins 43 into the hole in the discs 3 and 4. Some of these drive pins will be aligned with holes at all times and some will be misaligned. The pins 43 that are misaligned with the holes in the disc, will be stopped and the detent ring 9 will move from the groove at the right of the pins to the groove at the left, thereby engaging the holes loosely. This looseness allows a slight movement between the flange 17 and the teeth 18, thereby allowing the teeth to smoothly engage each other.

When the cam surfaces part company (see FIG. 6) actual force on the disc pack in released and the two sides of the system are free to rotate relative to each other, but only until half the drive pins strike the sides of the kidney shaped holes as shown.

With release of friction torque, drive is assumed by drive pins 43 and gear teeth 17A, and 18, not yet touching, are almost but not quite aligned. The ends of these gear teeth are wedge shaped for more easy alignment.

As engagement continues, the gear teeth contact, the drive pins are cammed slightly out of contact with their kidney shaped holes engagement is completed and detent 16 re-engages the surfaces 16A.

DISENGAGEMENT

Assuming the clutch is engaged, the operator admits oil to the disengaged line 69'. This forces the annular piston ring 82 into engagement with the flange 49'. As oil reaches the inner axially free annular steel ring 73, the oil pushes the ring 73 toward the radial surface on the flange 49' preventing leakage at this point. The oil flows through the holes 72', 66 into the cavity 67 and fills this cavity. Centrifugal force acting on the oil in cavity 67 moves the piston 29 to the right taking with it piston sleeve 20, gear 18, cam ring 11, detent ring 9, and pin 43. The drive pins 43 are fully withdrawn from the kidney holes before the coupling teeth 18 are disengaged. As the piston 29 continues to the right, detent ring 9 and spring plungers 15 pick up their respective parts to carry them along. When the synchronizing ring 7 strikes the retaining ring 8 it stops, forcing the spring plungers to depress. At the same time, the shoulders of the drive pins 43 strike the synchronizing pin support ring 13 and detent ring 9 is depressed.

With completion of the piston travel, all parts are back in their orignial positions. Releasing the control switch returns the four-way valve to neutral, cutting off the disengage oil and allowing the cylinder to drain. Disengagement is now completed.

DETAILED DESCRIPTION OF DRAWINGS

THE DISC PACK

The disc pack is made up of the disc carrier 6 that is supported on the clutch shaft 48 and the carrier 6 has external lines that are received in slots in the disc 3. The discs 4 are supported on internal teeth 2A, on load end sleeve 2 which is carried on the flange 39' welded to drive shaft 49. Lubricating oil flows from valve 85 between shaft 49 and sleeve 48 and through the opening 16' in the sleeve 48 and through the openings inside the sleeve 6 to the disc pack.

When the flow of engage oil increases oil enters the opening 16' at a greater rate than it escapes through opening 68 which is smaller and the disc pack fills with oil.

THE BALKING MECHANISM

The force to engage the clutch is applied by piston 29, but the gears cannot engage until the drive has synchronized. Sleeve 20 and piston sleeve 27 are all fixed together and apply a force to the synchronizing sleeve 7 through balking pins accelerating the driven shaft. The piston sleeve 27 has the external teeth 18 on it which engage internal teeth 17A on power end sleeve 17 when the clutch engages.

Balking pins 46 are fixed to the sleeve 7 and when the pins 46 and their sleeves 7 are initially rotated slightly relative to the cam plate 11, the pins engage the cam plate and into openings in it and the force of the piston is transmitted through the pins 46 to ring 7 thereby effecting engagement of the clutch plates with each other.

The sleeve 27 is fixed to rings 11 and 12 and carries detents 9 and 15 and the force of the piston is initially transmitted from the sleeve 27 through ring 11 and pins 46 to the ring 7 and thence exerts a force on the discs.

The ring 13 is fixed to sleeve 7 and ring 13 slidably supports the ring hand end of the drive pins 43 while the left hand end is slidably supported in the sleeve 7.

Pins 43 have spaced circumferential grooves 43A and 43B and the detent ring 9 is received in groove 43B prior to engagement, but when some of the pins 43 stop against the area between kidney shaped openings in the driven discs, the detent ring 9 will move from the groove 43B to the groove 43A, advancing the pins that align with holes but not advancing others.

At synchronism, the lateral component of force on the pins 46 is removed and the pins 46 slide into their openings in cam plate 11 releasing clutch plate pressure and allowing the piston sleeve 27 to continue its travel toward the left advancing the drive pins that are aligned with the kidney shaped holes thus loosely connecting the drive and driven shafts, and allowing the drive and driven shafts limited relative motion to admit the drive teeth to the driven teeth which takes place as the piston shaft proceeds to the left.

THE STATIC SEAL

The static seal ring 53 is freely supported on the drive shaft 50 between the flange 49' and the seal spacer 54. The ring has two flat ends and concentric cylinder grooves 80 and 81 are formed in the side of the ring adjacent flange 49' which receives piston rings 73 and 73'. These rings overlie the narrower grooves 79 and 79' in the flange. The flange 49' is fixed to the cylinder sleeve 21 by screws 50'. Engage oil is connected to the line 61 and 61' from valve V. Disengage oil is connected to the line 69' and passage 69 through groove 80 and 79' and openings in ring 73 to passage 66' and then through opening 66 in the sleeve 21 into the cavity 67. Lubricating oil flows from valve 85 to passage 61 to the various parts of the clutch.

DETAILED DESCRIPTION OF DRAWINGS

Now with more particular reference to the drawings, the clutch shown comprises a driven shaft or input shaft 50 and an output or load end shaft 49, supported in alignment with each other. The input shaft 50 is carried in the ball bearing 35, in the end housing 1 and the load end shaft 49 is carried in the ball bearing 35 at the load end of the housing 1. Suitable bearing cap 40 attached by studs 41 to housing 1 holds the bearings 35 in their respective housings at each end and the bearings are locked into the shaft against a suitable shoulder by the lock nuts 37 and oil slingers 36.

An outwardly directed flange 39' welded to shaft 49 is fixed to the load end sleeve 2 by the bolt 39 and the inwardly directed flange 17 is attached to the load end sleeve 2. The flange 17 has inwardly directed teeth 17A that engage the teeth 18 on the piston sleeve 27 when the coupling is fully engaged.

The drive shaft 49 has a sleeve 48 fixed to it and sleeve 48 receives the bearings 32, which pilot the load end shaft 49 in input shaft 50. The sleeve 48 has outwardly directed openings 16' in it through which oil can flow from passage 61 and opening in the disc carriers 6 allows oil to enter the disc pack. The disc pack 6 has longitudinally extending teeth 3A thereon that are received in notches in the clutch discs 3.

The annular cylinder 21 is fixed to flange 49' by screws 50' and the cylinder 21 has the annular, outwardly directed piston stop 23 with its piston ring 22 on it, which provides a cavity for disengage oil flowing through the openings 66 in the inner periphery of the cylinder 21 from the disengage opening 72'. Oil may enter cavity 64 from passage 72 from groove 81. The oil in the cavity 64 on the up-stream side of the piston 29 can move the piston 29 from one end of the cylinder 21 to the other by engage oil introduced through line 69' openings 61 and 72.

Discs 4 have external peripheral grooves that receive the internal splines 2A on the inside of load end sleeve 2. Disc carrier 6 is fixed to sleeve 48 to rotate with it and has splines 3A that are received in grooves in the inner periphery of disc 3; thus, the discs 3 rotate with input shaft 50, and the discs 4 rotate with load end shaft 49.

The synchronizing mechanism is made up generally of piston sleeve 27 which slides on the sleeve 48, and synchronizing sleeve 7 which slides on the sleeve 27 and also slides on the teeth 3A.

The sleeve 27 has ring 11 and ring 12 fixed to it while sleeve 7 has ring 13 fixed to it. When the synchronizing pins 46 are aligned with the openings in the cam plate 11, the piston sleeve slides on the synchronizing sleeve 7 but when ring 7 has rotated slightly relative to the rings 11, the pins 46 are out of alignment with the openings in the ring 11 so that the ring 7 is pushed toward the disc pack by the piston sleeve 27. Thus, the synchronizing pins 46 acts as balking pins which prevent relative axial movement between the sleeve 27 and the sleeve 7 when the speed of the driven member is not synchronized with the speed of the drive member.

The piston sleeve 20 is fixed to the sleeve 27 by bolts 19. The sleeve 27 has external teeth 18 which mate with internal teeth 17A on the flange 17 when the coupling is fully engaged.

The sleeve 27 carries the spring loaded plungers 15 and also the fixed detents 16A which selectively engage the resilient detent ring 16. The detent 9 extends only partly down from its grooves 43A and 43B by piston 29. The detent 15 initially engages the synchronizing pin support ring 13 and moves it with the piston 20. The sleeve 27 has an internal spline 16B which slidably engages the external spline 16C on the sleeve 48 and restrains them to rotate together.

Pin support ring 12 is fixed to the ring 7 by screws 14. Synchronizing ring 7 has internal teeth 8A which can slide on spline 3A. Detent ring 12 and cam plate 11 are fixed to piston sleeve 27 by screws 10.

The cam plate 11 has cam surfaces 7A against which the cam surfaces 7B on the ends of the synchronizing pins 7C abut during the initial steps of synchronization thereby blocking the pins 43 from entering holes 71.

A plurality of axially spaced drive pins 43 are supported on the synchronizing pin support ring 7 and slideably supported on ring 13. At least one of the pins 43 is at all times aligned with a hole in a driven disc 4. The pin support ring 13 is held to the synchronizing ring 7 by screws 14 and the pins 43 are cylindrical in shape with the spaced grooves 43A and 43B therein shown.

The synchronizing sleeve 7 has cylindrical holes that slideably receive the left hand end of the pins 43 so that the cylindrical left hand end can move into the elongated holes 72 in the friction discs 3 and in the steel disc 4.

The rotating elements of the clutch include the input shaft 50, sleeve 48 on which the disc pack 6, synchronizing sleeve 7, sleeve 27 and locking pins, torque transfer mechanism are mounted.

Output shaft 49 has the load end of sleeve 2 and disc 4 attached to it and they are disposed concentric to each other and concentric to the load shaft 49.

Piston sleeve 20 and sleeve 27 with synchronizing pin support ring 13 and detent ring 12 and cam plate 11 are slideably supported on sleeve 48 and rotate with it.

Synchronizing assembly including synchronizing ring 7, pin support ring 13 and detent ring 11 are slideably supported on sleeve 20 and teeth 3A on sleeve 6.

The clutch and load end shaft 50 and power shaft 49 are each supported on roller bearings 32, while the input and output shafts are supported and axially located in the clutch case by ball bearings 35. When the clutch is engaged, the entire rotating element assembly turns as a single unit on ball bearing 35. When disengaged, the output shaft 49, load end sleeve 2 and the disc pack stand still while the remaining parts rotate with the input shaft 50.

Shaft 49 connection to the load and shaft 50 connection to the turbine can be connected by splines, flanges or by another suitable connecting means. A provision can be made to permit the clutch installation and removal without disturbing the connecting equipment.

Engage oil is forced into the disc pack in around the plates 3 and 4 and they then exert sufficient viscous drag on each other to rotate the pins 46 out of alignment with holes 71 in the detent ring.

As friction torque is developed between the discs 3 and 4, and the disc carrier 6 and the load end sleeve 2, the synchronizing ring 7, and synchronizing pin support ring 13 and 43 are rotated circumferentially as an assembly until the small diameter of the pins 46 strike the sides of the holes 71 in the cam plate 11, through which they project. This brings the cam surfaces of the cam plate 11 and the synchronizing pins 46 into contact in the position shown in FIG. 12. As axial force builds up in the chamber 64, the geometry of the cam surfaces 7A is such that force of piston sleeve 20 is transmitted directly through plate 11 and sleeve 7 to the disc pack and friction torque begins to to accelerate the load shaft 49.

The rate of increase of this torque is controlled by the hydraulic design and as differential speed decreases, the contact friction between the friction discs takes over and completes the synchronizing process.

In engaging the clutch with the load at rest, engaging oil is admitted to line 61 from valve VI and the sleeve fills with oil and causes a drag on the discs 3 and 4. When the oil reaches the outer axially free annular seal ring 73, it pushes the piston seal ring 73 against the radial surfaces of the input shaft, flange 53 sealing against leakage at this point. As the supply of oil exceeds the discharge rate through the hole 63 and the cylinder sleeve 21, the annular cavity 64 fills with oil and exerts a pressure on the end of the annular piston 29 pushing the piston 29 to the left and moving with it the piston sleeve 20, toothed hub 18, cam plate 11, pin support ring 12, ring 7, retaining ring 9 and drive pins 43. When sleeve 7 engages discs 4, detent 15 is depressed and sleeve 7 moves toward the position shown in FIG. 2 and the discs 4 and 3 are pressed toward each other by synchronizing ring 7.

When synchronism is reached, slipping between the discs 4 and 3 stops and the accelerating torque is reduced to zero. The forces on the cam surfaces are unbalanced, the force of detent 15 are overcome and the piston sleeve 27 begins to move to the left taking with it the cam plate 11, with the synchronizing rings 7 remaining at rest.

The detent ring 9 pushes the synchronizing pins 43 to the left to engage the kidney shaped holes in disc 44 shown in FIG. 10 and 11.

As indicated in FIGS. 10 and 11, the relative circumferential positions of the kidney shaped holes and the drive pins is a random one and half of the pins could strike the lens between the holes and stop. If this occurred, the detent 9 would depress into its groove to release these pins, but the remainder of the pins (never less than half of them) would be projected into the kidney shaped holes.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A synchronizing clutch comprising
   a drive shaft,
   a driven shaft,
   a driven clutch plate and
   a driven gear and synchronizing means thereon
   said synchronizing means being adapted to connect said drive shaft to said driven shaft,
   drive clutch plates and drive gear means on said drive shaft,
   said synchronizing means comprising drive pins on said drive shaft adapted to loosely engage holes in said driven clutch plate,
   blocking means,
   liquid supply means adapted to apply a viscous drag to said clutch plates for engaging said blocking means,
   said blocking means being adapted to prevent said drive pins from engaging said holes until said driven shaft has reached synchronized speed,
   means to disengage said blocking means thereby relieving pressure on said clutch plates and moving said drive pins into said holes when said driven shaft has reached synchronized speed,
   whereby said drive shaft is connected to said driven shaft with torsional looseness,
   said liquid means being adapted to move said drive gear into engagement with said driven gear after said drive pins have loosely entered said holes and said drive clutch plates have been disengaged from said driven clutch plate.

2. The synchronizing clutch recited in claim 1 wherein said drive pins have axially spaced grooves and some said drive pins engage spaces between said holes in said driven clutch disc,
   a detent means on said synchronizing means engaging first said grooves and moving some said drive pins into engagement with said holes,
   said detent means moving into said second groove in said pins that engage said driven clutch plate between said holes.

3. The clutch recited in claim 1 wherein the ends of said drive gear teeth and said driven teeth are wedge shaped whereby
   said driven teeth are facilitated in their movement into sliding engagement with said drive gear teeth.

4. The clutch recited in claim 3 wherein said holes are sufficiently larger than said drive pins to allow said driven disc to move relative to said drive discs sufficient to allow said gear teeth on said drive members to freely slide into said gear teeth on said driven member.

5. The clutch recited in claim 4 wherein said liquid is oil and said discs are contained in a generally cylindrical disc pack and said disc pack has a relatively large hole for allowing said oil to enter said disc pack and a relatively small hole for allowing said oil to escape from said disc pack whereby said disc pack fills with oil and said oil is applied to said disc to introduce said viscous drag therebetween.

6. The clutch recited in claim 1 wherein said synchronizing means comprises
   a synchronizing ring having said blocking means fixed thereto and
   said drive pins slidably supported thereon and
   said drive pins are engaged by a detent ring.

7. The clutch recited in claim 6 wherein said liquid means comprises
   a piston sleeve slidably supported on said drive means and
   said detent means comprises a detent ring on said piston sleeve
   said detent ring engaging said synchronizing sleeve for applying said force to said discs from said liquid means through said synchronizing pins.

8. The clutch recited in claim 7 wherein said piston sleeve has a first detent thereon for initially moving said synchronizing ring into engagement with said discs whereby said discs are forced into frictional engagement with each other.

9. The clutch recited in claim 8 wherein said piston sleeve has a detent ring engaging said grooves in said drive pins.

10. A synchronizing clutch comprising a drive shaft and a driven shaft,
    drive clutch plates on said drive shaft,
    driven clutch plates on said driven shafts,
    synchronizing means for forcing said plates together for transmitting torque between said shafts,
    static seal means for connecting oil to said synchronizing means comprising a flange on said shaft,
    a static seal including a ring freely rotatably supported on said drive shaft adjacent said flange and a first groove in said flange concentric to said drive shaft,
    a second groove in said ring concentric to said drive shaft overlying said first groove,
    and piston ring in said second groove,
    said piston ring being flat on the side adjacent to the flange and engaging said flange,
    means for connecting oil to said second groove and holes in said piston ring for transmitting oil from said second groove to said first groove,
    said oil in said second groove being adapted to force said piston ring into sealing engagement with said flange.

11. The synchronizing clutch recited in claim 10 wherein said first grooves are formed in said flange concentric to said drive shaft and concentric to each other,
    two said second grooves are formed in said ring concentric to said drive shaft and overlying said first grooves,
    a first piston ring in one said first grooves and second piston ring in the other first groove,
    means for connecting oil to each said first grooves for connecting said oil to engage and disengage said clutch.

12. The clutch recited in claim 11 wherein said synchronizing means comprises a piston sleeve on said drive shafts,
    a synchronizing means on said driven shaft,
    and a detent ring on said piston sleeve for connecting said piston sleeve to said synchronizing ring,
    said synchronizing ring being adapted to engage said driven discs.

13. The clutch recited in claim 12 wherein said synchronizing ring has said drive pins slidably supported thereon and said detent means engages said drive pins.

14. The clutch recited in claim 13 wherein said detent means engages said synchronizing ring,
   forcing said synchronizing ring to move said discs into engagement with each other.

15. The clutch recited in claim 14 wherein said piston sleeve has lugs on the inside surface thereof,
   detent means provided on said drive means for initially retaining said piston against movement until a substantial oil pressure is built up against said piston.

16. The clutch recited in claim 1 wherein said synchronizing means comprises a piston sleeve concentrically disposed around said drive shaft,
   a synchronizing ring concentrically disposed around said piston ring and slideably supported thereon-
   said liquid means is adapted to move said piston sleeve from a disengage position to an engage position and means supported on said piston sleeve for engaging said synchronizing ring for moving said synchronizing ring selectively toward said clutch plates.

17. The clutch recited in claim 16 wherein said blocking means comprises blocking pins integrally supported in said synchronizing ring and extending in the direction away from said clutch plates,
   said synchronizing sleeve having a transversly disposed surface adapted to engage said driven clutch plates,
   said piston sleeve having a cam ring fixed thereto concentric to said driven shaft,
   said cam ring having openings therein for receiving said blocking pins when said piston sleeve moves toward said synchronizing ring after said driven shaft has reached synchronized speed,
   said blocking means further comprising cam means on said can ring adjacent said openings for engaging said blocking pins when said liquid means rotates said synchronizing means.

18. The clutch recited in claim 17 wherein said synchronizing ring has a pin support ring fixed thereto in axial space relation to said transversely disposed surface,
   said drive pins being slidably supported on said pin support rings.

19. The clutch recited in claim 18 wherein said liquid means comprises an annular cylinder supported on said clutch,
   and an annular piston received in said annular cylinder,
   a piston sleeve connected to said annular piston,
   said synchronizing means comprising a synchronizing sleeve slidably supporting said drive pins, and
   detent means connecting said piston sleeve to said synchronizing sleeve.

20. The clutch recited in claim 19 wherein said holes in said drive clutch plates are sufficiently long to loosely receive two said drive pins simultaneously.

21. The clutch recited in claim 20 wherein said holes are kidney shaped.

* * * * *